Figure 1:
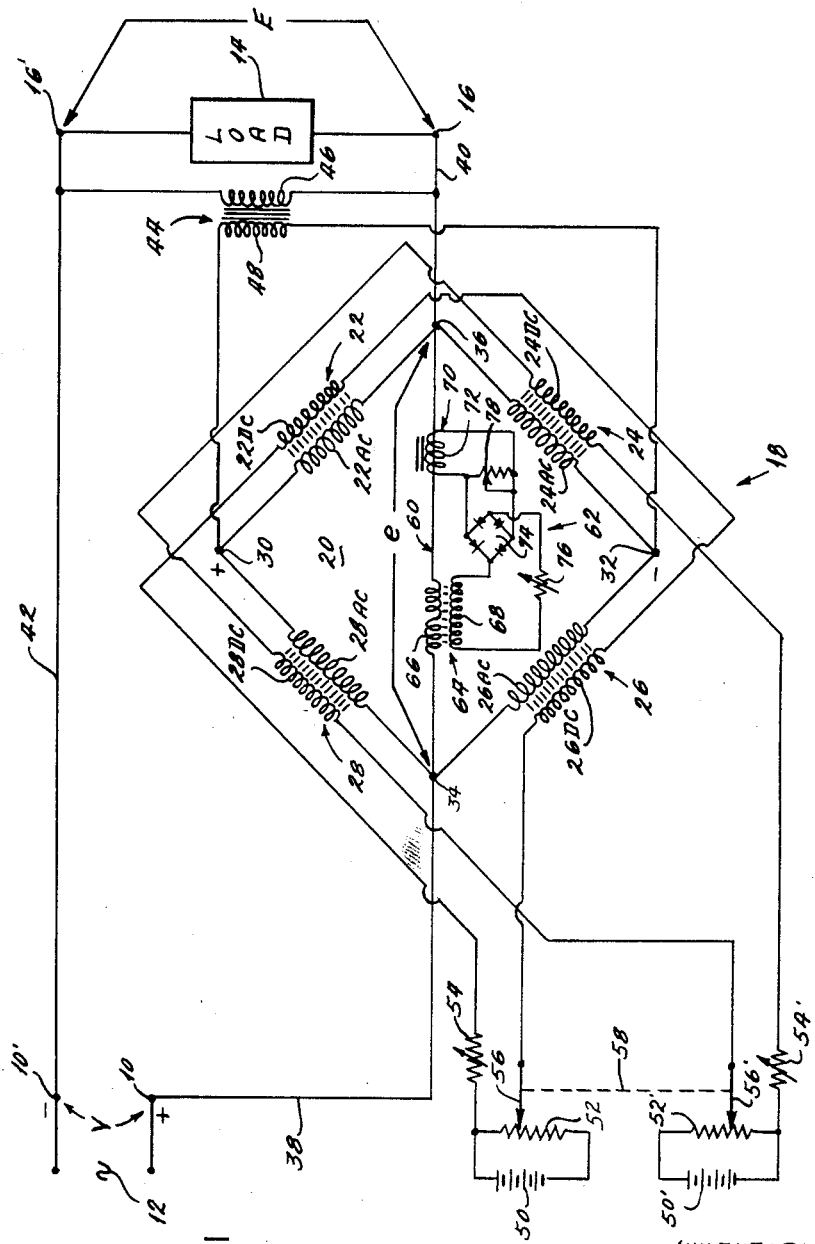

April 5, 1960     E. B. HILKER     2,931,969
ELECTRICAL CONTROL DEVICE
Filed June 30, 1958     2 Sheets-Sheet 1

INVENTOR:
ERWIN B. HILKER, DECEASED
By:— ANNAMARY HILKER, ADMINISTRATRIX
By Gravely, Lieder & Woodruff
ATTORNEYS.

April 5, 1960        E. B. HILKER        2,931,969
ELECTRICAL CONTROL DEVICE

Filed June 30, 1958        2 Sheets-Sheet 2

{ WITHOUT SUPPRESSOR 60 AND SUPPRESSOR CONTROL 62

{ WITH SUPPRESSOR 60 AND SUPPRESSOR CONTROL 62

INVENTOR:
ERWIN B. HILKER, DECEASED
By:- ANNAMARY HILKER, ADMINISTRATRIX

By Gravely, Liedee & Woodruff
ATTORNEYS.

United States Patent Office 2,931,969
Patented Apr. 5, 1960

2,931,969
ELECTRICAL CONTROL DEVICE

Erwin B. Hilker, deceased, late of St. Louis, Mo., by Annamary Hilker, administratrix, St. Louis, Mo., assignor to Wagner Electric Corporation, St. Louis, Mo., a corporation of Delaware Application June 30, 1958, Serial No. 745,660

12 Claims. (Cl. 323—66)

This invention relates to electrical control devices and more particularly to devices containing control circuits in which variable voltages are developed for control purposes.

Control devices containing control circuits for producing variable adjusting or compensating voltages, for example bridge circuits in which one or more impedance arms of the bridge include a saturable core reactor, often have the undesirable effect of introducing relatively high harmonic voltages in associated circuits. These harmonic voltages result from the saturation effects in the reactor cores. In systems employing such circuits there is also an undesirable phase shift between voltages in the system due to the reactance of the circuits. In such systems it has been found that the above undesirable harmonic voltage and phase shift effects are greatest when the bridge is at or near balance.

In accordance with the present invention the above undesirable effects are greatly reduced. In one form of the present invention, a variable impedance device is connected in a circuit in parallel with the output of a bridge circuit, and the impedance of the device is varied by means responsive to the flow of current through the device. The impedance of the device is varied in such manner that it is at a relatively high value when the bridge is unbalanced in either direction and at a relatively low or minimum value when the bridge is balanced.

It is therefore an objective of the present invention to provide an improved electrical control system employing a variable voltage producing network for control.

Another object of the present invention is to provide a new and useful bridge circuit.

Another object is to provide an electrical control device employing saturable core reactor means wherein the effects of harmonic voltages normally resulting from saturation effects in the reactor cores are greatly reduced.

Another object is to provide relatively simple and inexpensive means for automatically suppressing harmonic effects in a reactance type bridge circuit.

Another object is to greatly reduce the amount of phase shift between power input and output voltages in a voltage control system employing a reactance type bridge circuit for voltage control.

Still another object of the invention is to provide a voltage control system employing a saturable core reactor type bridge circuit wherein the harmonic voltages normally present in the output of the system, and the phase shift between input and output voltages of the system are geratly reduced by relatively simple and inexpensive means.

A further object is to provide a novel harmonic and phase shift suppressor for use with a voltage control device employing saturable core reactor means.

Further objects and advantages of the present invention will be apparent from the following description, reference being had to the accompanying drawings wherein a preferred embodiment of the present invention is clearly shown.

Figure 2:
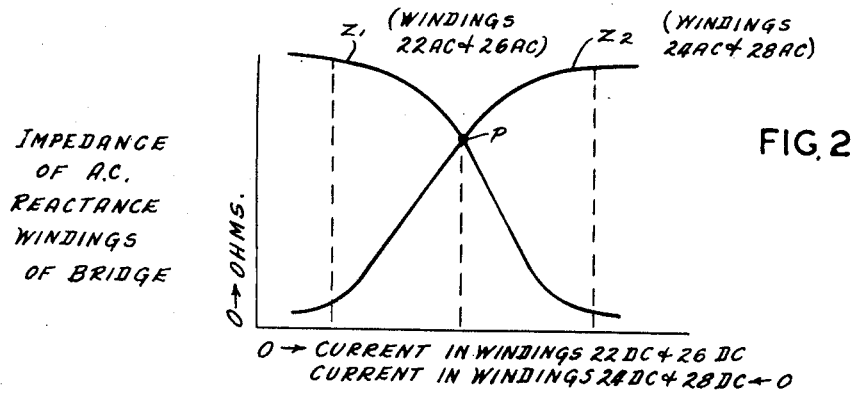
Figure 4:
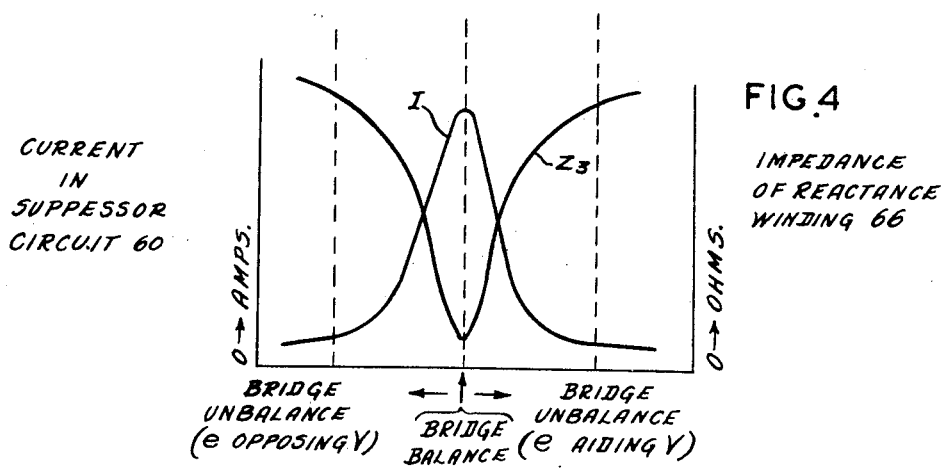
Figure 3:
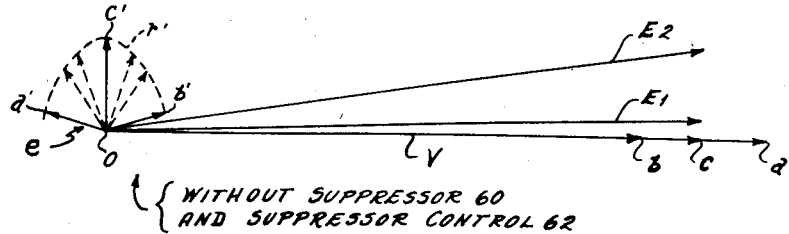
Figure 5:
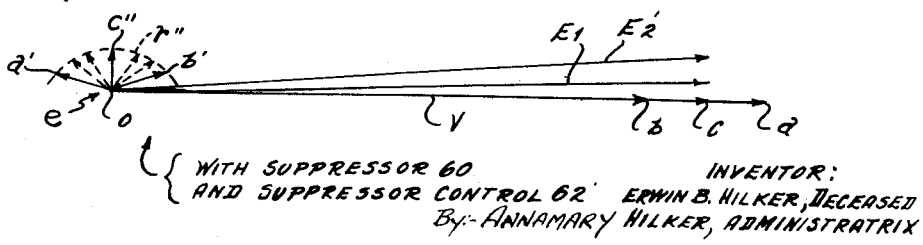

In the drawings:

Figure 1 is a schematic diagram illustrating an electrical control device embodying the present invention, Figure 2 is a chart with curves showing the impedance values of the reactors of the bridge 20 of Figure 1 as a function of the current in the control windings of the bridge, Figure 3 is a vector diagram illustrating the phase relationships between the various voltages in the circuit of Figure 1 without benefit of the present invention, Figure 4 is a chart with curves showing the magnitude of the current in the circuit 60 and the impedance of the reactance winding 66 over the control range of the bridge 20 of Figure 1, and Figure 5 is a vector diagram illustrating the phase relationships between the various voltages in the circuit of Figure 1 with benefit of the present invention.

The circuit of Fig. 1 includes a pair of power input terminals 10 and 10' to which is connected an A.C. supply source 12 for supplying power to a load 14 connected across a pair of power output terminals 16 and 16', and a variable voltage producing control circuit 18 connected in circuit between the supply source and load for providing an adjusting voltage for controlling the power output or load voltage within predetermined limits.

The voltage control circuit 18, in the illustrated embodiment, includes a bridge circuit 20 which, for example, includes four saturable core reactors, 22, 24, 26, and 28. Each reactor consists of a magnetic core carrying a main or A.C. reactance winding, and a D.C. control winding for controlling the saturation of the core and therefore the impedance of the reactance winding. The reactor, and the reactance and control windings of each reactor are identified by like numbers, but with the letters "AC" and "D.C." added to the reactance winding and control winding, respectively.

The reactance windings of the four reactors are shown connected together in the form of a Wheatstone type bridge circuit with one reactor in each of the four impedance arms of the bridge. One end of each of the adjacent windings 22AC and 28AC is connected to a bridge corner 30 which serves as one bridge input circuit terminal, while one end of each of the adjacent windings 24AC and 26AC is connected to a bridge corner 32 which serves as the other bridge input circuit terminal. The other end of each of the adjacent windings 26AC and 28AC is connected to a bridge corner 34 which serves as one bridge output circuit terminal, while the other end of each of the adjacent windings 22AC and 24AC is connected to a bridge corner 36 which serves as the other bridge output circuit terminal.

The bridge circuit 20 is shown connected in series circuit relation between the supply source 12 and the load 14 by a line conductor 38 which connects the bridge output terminal 34 with the power input terminal 10, and a line conductor 40 which connects the bridge output terminal 36 with the power output terminal 16. The power circuit is completed by a line conductor 42 which connects the power input terminal 10' with the power output terminal 16'.

Although the bridge circuit 20 is shown including four separate cores with an A.C. reactance winding and a D.C. control winding on each core, other winding and core arrangements may be used if desired. For example, each set of diametrically opposed or non-adjacent reactors may be combined into a single reactor unit containing a three-legged core provided with the two A.C. windings of the set on the outer legs of the core and a common D.C. control winding on the center leg. In such a case the bridge circuit contains two sets of opposed reactors with each set combined into a single reactor unit.

Across the input terminals of the bridge is impressed a substantially constant A.C. voltage. As shown in the drawing for illustration, the input voltage to the bridge is obtained by means of a transformer 44 having a primary winding 46 connected across the power output terminals 16 and 16' and a secondary winding 48 connected across the bridge input terminals 30 and 32. The maximum obtainable output voltage of the bridge is determined by the magnitude of the A.C. voltage impressed across the bridge input terminals.

The bridge 20 provides a variable phase adjusting voltage $e$ across the bridge output terminals 34 and 36 which is combined with the power supply voltage V for affecting the power output or load voltage E. In accordance with the balance condition of the bridge, the adjusting voltage $e$, with respect to the magnitude of the supply voltage, is substantially ineffectual at balance and aiding the supply voltage or opposing the supply voltage when the bridge is unbalanced.

The balance conditions of the bridge are determined by the relative impedance values of the two sets of opposed reactance windings, which in turn, are determined by the relative values of the currents flowing in the control windings of the two sets of opposed reactors. As shown in Figure 1, the control windings 22DC and 26DC of the one set of opposed reactors are connected in series with each other and to a suitable source of D.C. control current which is illustrated simply as including a battery 50 connected across a potentiometer 52. One end of the potentiometer is connected to one end of the winding 22DC through an adjustable resistance 54, while the movable arm 56 of the potentiometer is connected to one end of the winding 26DC. Similarly, the control windings 24DC and 28DC of the other set of opposed reactors are connected in series with each other and to a suitable source of D.C. control current shown as a battery 50' connected across a potentiometer 52'. One end of the potentiometer 52' is connected to one end of the winding 24DC through an adjustable resistance 54', while the movable arm 56' of the potentiometer is connected to one end of winding 28DC.

The potentiometer arms 56 and 56' are shown coupled together for concert movement, as indicated in the drawing by the dashed line connection 58. It will be noted, that if the potentiometer arms are moved in either direction, the current in the control windings of one set of opposite reactors varies inversely with respect to the current flowing in the control windings of the other set of opposite reactors, i.e., as the current increases in one set of control windings the current in the other set of control windings decreases, and vice versa.

The bridge may be automatically controlled by mechanical or electrical means and in response to any selected condition or quantity of the particular system used, and for such purposes as maintaining the load voltage substantially constant, for varying the load voltage in a desired manner, or for regulating or controlling some other electrical or mechanical quantity; but, for simplicity, the simple battery and resistance circuits are shown in Figure 1. In the discussion which follows, it will be assumed that the power supply voltage V varies above and below a predetermined or normal value, and that the balance of the bridge is controlled in such manner that the adjusting voltage $e$ compensates for the changes in the supply voltage to thereby maintain the load voltage at, or return it to, its predetermined or normal value.

In Figure 2, there is shown impedance curves of the reactance windings of the two sets of opposed reactors of the bridge as a function of the control current flowing in the control windings of the bridge. The curve $Z_1$ shows the impedance curve of the one set of opposed reactance windings 22AC and 26AC as a function of the control current in the control windings 22DC and 26DC, while the curve $Z_2$ shows the impedance curve of the other set of opposed reactance windings 24AC and 28AC as a function of the control current in windings 24DC and 28DC. At the crossover point of the two curves, indicated at a point $p$, the impedance values of the reactance windings of the bridge are equal and the bridge is at balance.

It will be assumed herein that when the arms 56 and 56' of the potentiometers 52 and 52' are in the positions shown in Figure 1, equal currents flow in the D.C. control windings of the two sets of opposed reactors and the impedance values of all four reactance windings are equal and the bridge is balanced. Furthermore, it will be assumed that when the bridge is balanced the supply voltage V and load voltage E are at their respective predetermined or normal values.

As indicated by the instantaneous polarity signs shown in Figure 1, the bridge terminal 30 is positive with respect to bridge terminal 32 when the supply terminal 10 is positive with respect to supply terminal 10'. Under these given conditions, the adjusting voltage $e$ tends to oppose the supply voltage when the impedance values of reactance windings 24AC and 28AC are lower than the impedance values of windings 22AC and 26AC, and tends to aid the supply voltage when the impedance values of reactance windings 22AC and 26AC are lower than the impedance values of windings 24AC and 28AC.

The operation of the circuit thus far described is as follows:

If the supply voltage increases from its normal value, the arms 56 and 56' are moved in the upward direction from their positions shown. This decreases the current in windings 22DC and 26DC and increases the impedance of reactance windings 22AC and 26AC. At the same time, current in windings 24DC and 28DC is increased to cause a decrease in the impedance of reactance windings 24AC and 28AC. Movement of the potentiometer arms in this direction unbalances the bridge in the opposing direction to provide an adjusting voltage $e$ which opposes the supply voltage V to thereby compensate for the increase in supply voltage and maintain the load voltage E at its normal value, or return it to its normal value. On the other hand, if the supply voltage V decreases from its normal value, the potentiometer arms are moved in the downward direction from their positions shown in Figure 1. This increases the current in windings 22DC and 26DC causing a decrease in the impedance of windings 22AC and 26AC, while causing a decrease in the current in windings 24DC and 28DC and an increase in the impedance of windings 24AC and 28AC. The bridge under these latter conditions is unbalanced in the other direction to provide an adjusting voltage $e$ which aids the supply voltage V to thereby compensate for the drop in the supply voltage and maintain the load voltage E at its predetermined value.

In Fig. 3, there is shown a vector diagram illustrating the relative phase relationships between various voltages that would be obtained in the circuit thus far described. The vectors $o$—$a$ and $o$—$b$ represent particular values of supply voltage above and below the normal value, respectively, while the vector $o$—$c$ represents the supply voltage at a given predetermined or normal value. The dashed-line curve $r'$ represents the locus of the ends of the adjusting voltage vectors over the control range of the bridge. When the supply voltage is above normal, as indicated by the vector $o$—$a$, the bridge is unbalanced in a direction to provide an adjusting or compensating voltage $e$ as indicated by the vector $o$—$a'$. Vectorially adding the vectors $o$—$a$ and $o$—$a'$ results in an output voltage vector $E_1$ which represents the desired or normal output voltage value. If the supply voltage drops below the normal value, for example, as indicated by the vector $o$—$b$, the bridge is unbalanced in the other direction to provide an adjusting voltage $e$ as indicated by the vector $o$—$b'$. Vectorially adding the vectors $o$—$b$ and $o$—$b'$ results again in the normal output voltage vector $E_1$.

When the supply voltage is at its normal value the bridge is balanced and an undesirably large voltage $e$, as indicated by vector o—c', exists across the output terminals of the bridge. This voltage is substantially in right angular relation with the supply voltage vector o—c. Combining the two results in an output voltage vector $E_2$. Since the adjusting voltage vector o—c' is substantially in right angular relation with the supply voltage, the magnitude of the output voltage, vector $E_2$, is very close to the normal output voltage value, however, it is considerably shifted in phase from the supply voltage. It will be apparent from Fig. 3 that as the bridge approaches the balance point in its control range, the phase shift between the power supply and output voltages considerably increases. For example, the phase angle between the supply voltage vectors and the output voltage vector $E_2$ (bridge balance), is much greater than the phase angle between the supply voltage vectors and the output voltage vector $E_1$ (bridge greatly unbalanced).

Besides the undesirable phase shift between the supply and load voltages in the circuit thus far described, it has been found that harmonic voltages, present in the adjusting voltage e, are introduced into the load circuit. While these harmonic voltages are at very low values when the bridge is greatly unbalanced in either direction, they increase in magnitude as the bridge approaches balance and reach their greatest magnitudes at or near the balance point in the bridge control range.

By adding, in accordance with the present invention, a suppressor circuit 60 and a suppressor control circuit 62 to the circuit thus far described, the magnitude of the adjusting voltage over a center portion of the bridge control range, which includes the balance point, is greatly reduced, whereby the magnitude of the harmonic voltages otherwise introduced into the load circuit and the normally large phase shift between the supply and load voltages are also greatly reduced.

The suppressor circuit 60 of Fig. 1, which may be referred to as a harmonic and phase shift suppressor circuit, includes a variable impedance device shown as a saturable core reactor 64 having a magnetic core carrying a main or reactance winding 66 and a D.C. control winding 68 for controlling the impedance of the reactance winding. The reactance winding 66 is connected in the suppressor circuit in parallel with the bridge or electrically between the output terminals 34 and 36 of the bridge.

The impedance of the reactance winding 66 is automatically controlled by means of the suppressor control circuit 62. The control circuit 62, in the illustrated embodiment, includes a series or current transformer 70 coupled in the suppressor circuit 60 in series with the reactance winding 66. As shown, the transformer 70 has a secondary winding 72 connected to the A.C. terminals of a full-wave bridge rectifier 74. The D.C. terminals of the rectifier are connected to the D.C. control winding 68 of the reactor through an adjustable resistor 76. An adjustable resistor 78 is shown connected across the secondary 72 to provide an initial voltage adjustment.

The suppressor circuit 60 provides an additional load current path in parallel with the bridge circuit. The load current flowing through the suppressor circuit is at a relatively high value when the bridge is balanced and decreases as the bridge is unbalanced in either direction. This is due to the fact that the total impedance of the bridge, with respect to the power supply circuit, is at a high or maximum value at balance, and as the bridge is unbalanced, the impedance of one set of reactance windings decreases thereby lowering the total impedance of the bridge.

By means of the suppressor control circuit 62, the impedance of reactance winding 66 is varied in response to the current flowing in the suppressor circuit 60. Current flowing in circuit 60 induces a voltage in the secondary winding 72 of transformer 70 which is proportional to the magnitude of current flowing in the circuit 60. The output current of the transformer 70 flows through rectifier 74 and the reactor control winding 68, to thereby vary the saturation of the magnetic core of the reactor and the impedance of reactance winding 66.

In Fig. 4, the curves $Z_3$ and I respectively represent the impedance of reactance winding 66 and the current flowing in the suppressor circuit 60 over the control range of the bridge. From these curves it is seen that the impedance of winding 66 varies inversely with respect to the current in circuit 60. It will be noted that the current in circuit 60, curve I, is at its maximum value and that the impedance of winding 66, curve $Z_3$, is at its minimum value when the bridge is balanced, and that as the bridge is unbalanced in either direction, the current in circuit 60 decreases while the impedance of winding 66 increases.

With the suppressor circuit in parallel with the bridge and the impedance of the reactance winding 66 at a low or minimum value at bridge balance, the undesirably large adjusting voltage e, otherwise present when the suppressor circuit is not employed, is considerably reduced. If the impedance in the suppressor circuit 60 could be reduced to zero when the bridge is balanced there would obviously be a short circuit across the output terminals of the bridge and no adjusting voltage whatsoever would exist. On the other hand, when the bridge is unbalanced to obtain a desirable adjusting voltage for affecting the load voltage, the impedance in the suppressor circuit is automatically increased to permit the development thereacross of the desired adjusting voltage.

In operation, when the supply voltage is at its normal value, the bridge is balanced and the current in the suppressor circuit 60, being at a maximum value at balance, induces a maximum voltage in the secondary winding 72 of the current transformer 70. Since the secondary voltage is at a maximum value, a maximum D.C. current flows out of the rectifier 74 and through the control winding 68 to thereby saturate the reactor core and cause the impedance of the reactance winding 66 to be at a minimum value. Because the impedance of winding 66 is very low or at a minimum value, the voltage e, appearing across the bridge output terminals at balance, is at a very low value.

As the bridge is unbalanced in either direction to provide a given adjusting or compensating voltage e, the impedance of one set of opposed reactance windings of the bridge is decreased, and the current flowing in the suppressor circuit is therefore also decreased. The decrease in current in circuit 60 reduces the induced voltage in transformer 70 and the D.C. current flowing in the reactor control winding 68, thereby increasing the impedance of reactance winding 66. The increase in the impedance of winding 66 has the effect of further decreasing the current flowing in the circuit 60, which in turn, results in a further increase in the impedance of winding 66. This action takes place until a state of equilibrium is reached. By this action, the impedance of the reactance winding 66 (curve $Z_3$, Fig. 4), is rapidly increased as the bridge is unbalanced so that any desirable adjusting voltage e can be developed thereacross to provide control or regulation of the load voltage.

Fig. 5 shows the phase relationships between the various voltages in the circuit of Fig. 1 when the suppressor circuit 60 and control 62 are employed. It will be noted that the height of the curve r" is much smaller than the height of the curve r' shown in Fig. 3. This means that the adjusting voltage, present at the output terminals of the bridge when the bridge is at or near balance, is greatly reduced by use of suppressor circuit 60 and control 62. For example, the adjusting voltage vector at balance, as indicated by the vector o—c" in Fig. 5, is much smaller than the adjusting voltage indicated by the vector o—c' in Fig. 3. On the other hand, the vectors o—a' and o—b' in Fig. 5, for unbalanced bridge conditions, are substantially unchanged with respect to the same vectors shown in Fig. 3. Thus, from a comparison of the vector diagrams shown in Figs. 3 and 5, it is seen that the adjusting voltages over a center portion of the bridge control range, which portion includes the balance point, are reduced in magnitude when the suppressor circuit and its control circuit are employed.

Because the adjusting voltage is reduced to relatively low values when the bridge is at or near balance, the phase shift or phase angle between the supply and output voltages is greatly reduced or maintained at low values. For example, it is seen that the phase shift between vectors $E'_2$ and $o$—$c$ in Fig. 5 (with suppressor circuit) is much smaller than the phase shift between vectors $E_2$ and $o$—$c$ in Fig. 3 (without suppressor circuit).

Since harmonic voltage components in the adjusting voltage are greatest when the bridge is at or near balance, the reduction of the adjusting voltages, in the manner described, greatly reduces the harmonic voltages in the power output of the system.

Furthermore, because a relatively large amount of the load current is shunted around the bridge due to the low impedance in the parallel-connected branch or suppressor circuit 60 when the bridge is at or near balance, the voltage drops across the bridge impedances and the losses otherwise occurring in the bridge circuit are also reduced.

The circuit shown in Figure 1 may be adapted, for example, for use in power transmission systems where voltage regulation is desired. In high voltage systems for supplying power to industrial and commercial loads from power stations, it is often desirable to regulate the voltage at the load. In such systems, power is often transmitted along power lines which are close to telephone lines; and where high harmonic voltages are present, telephonic interference can often occur. With the circuit of the present invention, these harmonic voltages are greatly suppressed or reduced, whereby telephonic interference in such systems can be substantially reduced or eliminated.

Although the output circuit of the bridge in Figure 1 is shown directly or conductively coupled into the power circuit, it may be inductively coupled into the power circuit by means of an additional transformer (not shown) if desired. In such case, instead of connecting the bridge output terminals 34 and 36 directly to the conductors 38 and 40 as shown, these terminals may be connected across the primary winding of the additional transformer, while the secondary winding of the transformer is connected directly into the power circuit.

While control of a single-phase voltage has been shown and described herein, the invention can equally well be used in polyphase voltage control systems. For example, in three-phase power systems, a bridge circuit with the suppressor circuit 60 and control 62 may be connected in each of the three lines of the system for control of the three-phase voltage.

It is to be understood that the foregoing description and accompanying drawings have been given only by way of illustration and example, and that alterations and changes in the present disclosure, which will be readily apparent to one skilled in the art, are contemplated as within the scope of the present invention, which is limited only by the claims which follow.

What is claimed is:

1. In an electrical control system comprising a power output circuit, and a power input circuit for supplying power to the output circuit, the combination therewith of a voltage control circuit connected in series with one of said power circuits for providing an adjusting voltage for affecting the voltage at the output circuit, said control circuit including saturable core reactor means for controlling said adjusting voltage, a branch circuit connected in parallel with said control circuit, a variable impedance device in said branch circuit, and means responsive to the flow of current in said branch circuit for varying the impedance of said device inversely with respect to said current.

2. In an electrical control system comprising a load circuit, and a power supply source for supplying power to the load circuit, the combination therewith of a voltage control circuit comprising input and output circuits, a voltage source connected to the input circuit, said output circuit being connected in series between said power supply source and said load circuit, reactor means connected between said input and output circuits, means for varying the impedance of said reactor means to produce a variable phase voltage at said output circuit, a branch circuit connected across said output circuit, a saturable core reactor having a reactance winding and a control winding, means connecting said reactance winding in said branch circuit, and means responsive to the flow of current in said branch circuit for supplying current to said control winding.

3. A bridge circuit comprising input and output circuits, means for supplying a voltage to the input circuit, bridge control means for controlling the balance of the bridge to produce a variable voltage at the output circuit, a branch circuit connected across the bridge output circuit, a variable impedance device connected in said branch circuit, and means including means responsive to the flow of current in said branch circuit for varying the impedance of said device inversely with respect to the magnitude of said current.

4. An electrical control system comprising power input and output circuits, a power supply source connected to the power input circuit for supplying power to the power output circuit, a bridge circuit having bridge input and output circuits, means for impressing a voltage across the bridge input circuit, means connecting the bridge output circuit in series relation with one of said power circuits, means for controlling the balance of said bridge circuit to provide a variable voltage at the bridge output circuit, a branch circuit connected in parallel with the bridge output circuit, a variable impedance device connected in said branch circuit, and means responsive to the flow of current in said branch circuit for varying the impedance of said device inversely with respect to said current.

5. An electrical control system comprising power input and output circuits, a power supply source connected to the power input circuit for supplying power to the power output circuit, an impedance bridge circuit having bridge input and output circuits, means for impressing a voltage across the bridge input circuit, means connecting the bridge output circuit in series with one of said power circuits, means for controlling the balance of said bridge circuit to provide a variable voltage at the bridge output circuit, a branch circuit connected in parallel with the bridge output circuit, a saturable core reactor having a reactance winding and a control winding, said reactance winding being connected in said branch circuit, and means responsive to the flow of current in said branch circuit for supplying current proportional to the magnitude of said current to said control winding.

6. An electrical control system comprising power input and output circuits, a power supply source connected to the power input circuit for supplying power to the power output circuit, an impedance bridge circuit having bridge input and output circuits, means for impressing a voltage across the bridge input circuit, means connecting the bridge output circuit in series with one of said power circuits, means for controlling the balance of said bridge circuit to provide a variable voltage at the bridge output circuit, a branch circuit connected in parallel with the bridge output circuit, a saturable core reactor having a reactance winding and a control winding, said reactance winding being connected in said branch circuit, transformer means coupled to said branch circuit for providing a signal responsive to the magnitude of current in said branch circuit, and means including a rectifier for supplying D.C. current proportional to said signal to said control winding.

7. In an electrical control system comprising power input and output circuits, and an A.C. power source connected to the power input circuit for supplying power to the power output circuit, the combination therewith of a bridge circuit having bridge input and output circuits and including a pair of saturable core reactors each connected in a different arm of the bridge circuit, each of said reactors having a D.C. control winding, means for supplying an A.C. voltage to the bridge input circuit, means connecting the bridge output circuit in series with one of said power circuits, means for supplying D.C. current to the D.C. control winding of each of said reactors, means for varying the D.C. current in each of said D.C. control windings to control the balance of said bridge circuit, a third saturable core reactor having a reactance winding and a D.C. control winding, said reactance winding being connected in a branch circuit in parallel with said bridge output circuit, and means including means responsive to the flow of current in said branch circuit for supplying a D.C. current proportional to the flow of current in said branch circuit to the D.C. control winding of the third reactor.

8. In an electrical control system, the combination of a bridge circuit having bridge input and output circuits and including four impedances connected together in a closed loop to provide two sets of opposed bridge corners, one of said sets of corners being connected to said input circuit, the other of said sets of corners being connected to said output circuit, means for impressing a voltage across said input circuit, control means for varying the value of at least one of said impedances to provide a variable voltage across said output circuit, a branch circuit connected across said output circuit, a variable impedance connected in said branch circuit, and means responsive to the flow of current in said branch circuit for varying the value of said variable impedance inversely with respect to the magnitude of the current in said branch circuit.

9. In an electrical control system, the combination of a bridge circuit comprising four reactors connected together to provide two sets of opposed reactors and two sets of opposed corners, means for impressing a voltage across one set of corners, and means for varying the impedance of at least one reactor of each set of reactors to provide a variable voltage at the other set of corners, a branch circuit connected across said other set of corners, a saturable core reactor having a reactance winding and a control winding, said reactance winding being connected in said branch circuit, and a current transformer coupled in said branch circuit in series with said reactance winding and having a winding coupled to supply current to said control winding.

10. A bridge circuit comprising bridge input and output circuits, at least two saturable core reactors each connected in a different arm of the bridge, each of said reactors having a D.C. control winding, means for supplying an A.C. voltage to said input circuit, means for supplying D.C. current to the D.C. control windings of said reactors, control means for varying the D.C. currents flowing in said D.C. control windings inversely with respect to each other to provide a variable voltage at said output circuit, a branch circuit connected across said output circuit, a third saturable core reactor having a reactance winding and a D.C. control winding, said reactance winding being connected in said branch circuit, a rectifier coupled to the D.C. control winding of said third reactor, and a transformer coupled to said branch circuit and having a secondary winding coupled to said rectifier to supply current to the D.C. control winding of the third reactor in response to the flow of current in said branch circuit.

11. A voltage control system comprising a power output circuit, a power input circuit connected to an A.C. power source for supplying power to the power output circuit, a bridge circuit having bridge input and output circuits and including four saturable core reactors connected together to provide two sets of opposed reactors and two sets of opposed bridge corners, means coupling one set of bridge corners to said bridge output circuit, means connecting said bridge output circuit in series with one of said power circuits, means coupling the other set of bridge corners to said bridge input circuit, means for impressing an A.C. voltage across the bridge input circuit, each set of reactors having at least one D.C. control winding associated therewith, means for supplying D.C. current to the D.C. control winding of each set of reactors, means for varying the D.C. currents in said D.C. control windings inversely with respect to each other to provide a variable voltage at said bridge output circuit, a branch circuit connected across said bridge output circuit, a fifth saturable core reactor having a reactance winding and a D.C. control winding, said reactance winding being connected in said branch circuit, a rectifier coupled to the D.C. control winding of said fifth reactor, and a current transformer connected in said branch circuit in series with said reactance winding and having a secondary winding coupled to said rectifier for supplying current responsive to the flow of current in said branch circuit to the D.C. control winding of the fifth reactor.

12. A power supply system comprising a load circuit, an A.C. source, supply lines connecting the A.C. source with the load circuit, and a voltage control circuit for controlling the voltage at the load circuit within predetermined limits, said control circuit comprising a Wheatstone type bridge circuit including four saturable core reactors each having a reactance winding, said reactance windings being connected together in a closed loop to provide two sets of opposed bridge corners, means for impressing an A.C. voltage across one set of bridge corners, means coupling the other set of bridge corners in one of said power lines in series circuit relation between the A.C. source and the load circuit, means including reactor control means for controlling the balance of the bridge circuit to provide a variable voltage across said other set of bridge corners, a branch circuit connected across said other set of bridge corners, a fifth saturable core reactor having a reactance winding and a control winding, means connecting the reactance winding of the fifth reactor in said branch circuit, and means for reducing the reactance of the reactance winding of the fifth reactor to a relatively low value when the bridge is balanced and for increasing its reactance to a relatively high value when the bridge is unbalanced, said latter means including a rectifier coupled to said control winding, and a current transformer connected in said branch circuit in series with the reactance winding of the fifth reactor and having a secondary winding coupled to said control winding through said rectifier.

References Cited in the file of this patent

UNITED STATES PATENTS

| | | |
|---|---|---|
| 2,310,886 | Wentz | Feb. 9, 1943 |
| 2,573,388 | Billing | Oct. 30, 1951 |

FOREIGN PATENTS

| | | |
|---|---|---|
| 699,740 | Great Britain | Nov. 18, 1953 |